UNITED STATES PATENT OFFICE.

AMOR SMITH, OF CINCINNATI, OHIO.

IMPROVEMENT IN DRYING LARD AND TALLOW.

Specification forming part of Letters Patent No. 142,743, dated September 9, 1873; application filed June 18, 1873.

*To all whom it may concern:*

Be it known that I, AMOR SMITH, of Cincinnati, in the county of Hamilton and State of Ohio, have invented a new and useful Mode of Drying Tallow or Lard after they have been melted or rendered with wet steam; and I do hereby declare that the following is a full, clear, and exact description of the same.

In another application of even date herewith I have shown one form of apparatus, by the use of which my invention may be practically worked. I do not, however, wish to be limited to any particular apparatus, as numerous modifications of apparatus applicable to working my invention may readily be contrived. The essential feature of my invention is the drying of tallow or lard, which has been rendered with wet steam or otherwise, so as to saturate it with water by forcing through the same currents of hot air. For this purpose a blower having sufficient power to force the air through the lard or tallow is required, with a pipe leading through any sort of a furnace for heating the blast, and a receiver for containing the substance subjected to the action of the blast are the essential parts of the apparatus.

By thus artificially drying the tallow or lard the moisture is entirely removed. It is necessary, therefore, that the air should be heated above the boiling-point of the water, but not to such a degree as to burn the substance treated. A temperature of from 225° to 275° of Fahrenheit's scale will sufficiently fulfill these conditions. The heated air should be introduced until the work of drying is thoroughly completed, when the substance may be cooled for packing.

What I claim as my invention, and desire to secure by Letters Patent, is—

The mode of artificially drying tallow or lard containing moisture, by passing through the same, while in a fluid state, currents of hot air, substantially as set forth.

In testimony whereof I have signed my name to this specification in the presence of two subscribing witnesses.

AMOR SMITH.

Witnesses:
JOHN W. CALDWELL,
LEANDER SMITH.